UNITED STATES PATENT OFFICE.

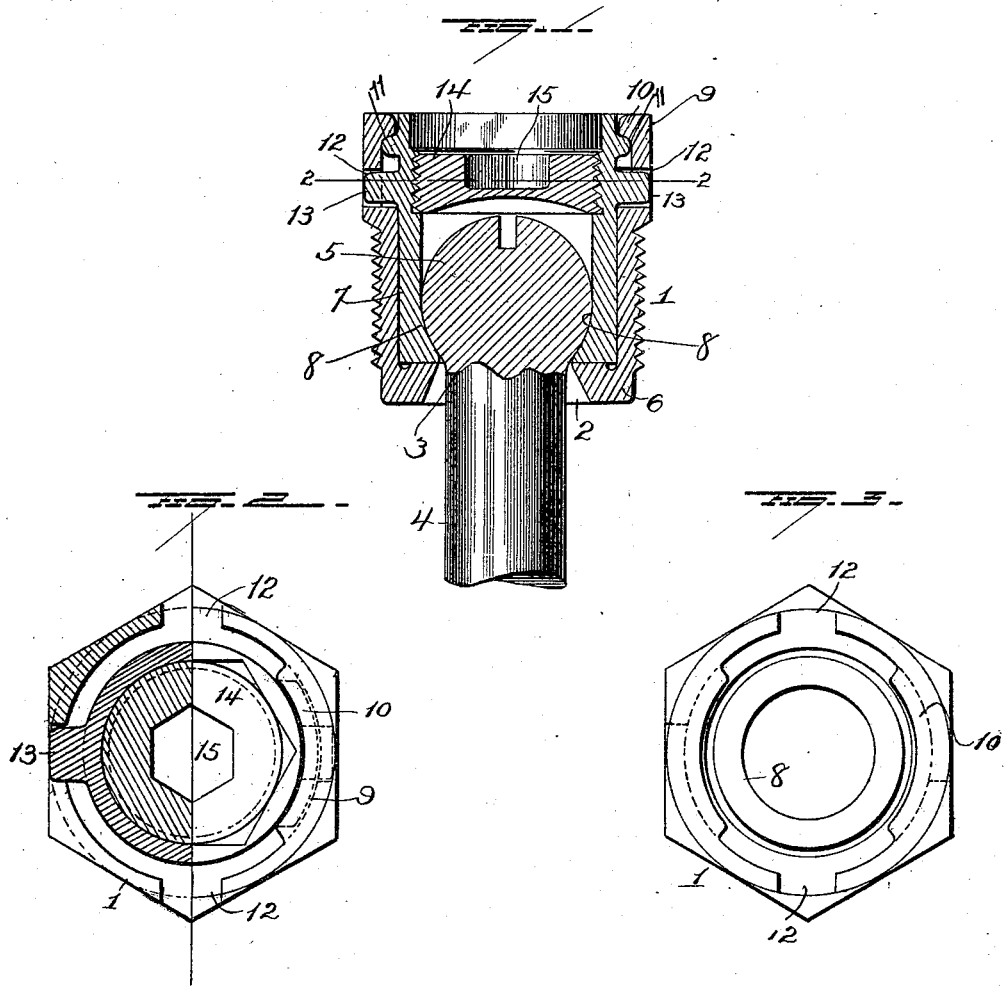

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,295,870.　　　　　　　Specification of Letters Patent.　　　Patented Mar. 4, 1919.

Application filed May 3, 1918. Serial No. 232,312.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structures and more particularly to the bearing and inclosing devices for the rounded or spherical head of a staybolt,— the object of the invention being to provide a structure of this character which will facilitate the quick and easy testing of the staybolt.

With this and other objects in view, the invention consists in certain novel features of construction and combinations of parts as hereinafter more fully described and pointed out in the claims.

In the accompanying drawings, Figure 1 is a longitudinal sectional view of a staybolt structure embodying my invention. Fig. 2 is a transverse sectional view, and Fig. 3 is a plan view of the bushing.

1 represents a bushing provided at its inner end with a tapering opening 2 for the accommodation of the neck 3 of a staybolt 4, the latter having a rounded or spherical head 5. The bushing 1 is provided at its inner end with a seat 6 for a sleeve 7 which fits neatly in the bushing 1, and this sleeve is provided interiorly with a curved face 8 which serves as a bearing for the rounded or spherical head 5 of the staybolt.

The bushing 1 is provided at its outer end with an annular extension 9 having inwardly projecting segmental shoulders 10 near its free end for coöperation with external segmental shoulders 11 on the bearing sleeve 7. The annular extension 9 of the bushing is also provided with slots 12 which are open at the outer edge of said annular extension and these slots may be located diametrically opposite each other. The bearing sleeve 7 is provided exteriorly with diametrically opposite lugs or fingers 13 which enter the slots 12 in the extension 9 and are adapted, when the sleeve 7 is turned to engage end walls of the slots 12 and thus serve as stops to limit the turning movement of said sleeve. The sleeve 7 may be made angular within its outer end for the accommodation of a socket wrench to facilitate the turning of said sleeve. A portion of the interior wall of the sleeve 7 is threaded to receive a threaded plug 14 which closes said sleeve over the head of the staybolt and this plug may be provided with a suitable socket 15 for the reception of a wrench.

When the parts shall have been assembled and the bearing sleeve 7 turned to the limit permitted by the engagement of the lugs or fingers 13 with end walls of the slots 12, the segmental shoulders 11 will have become disposed behind the segmental shoulders 10 in the extension 9 of the bushing and the parts will be held securely in place.

By turning the sleeve 7 until the segmental shoulders 11 shall have moved out of line with the segmental shoulders 10 in the extension 9, the operator may insert a suitable tool under one of the segmental shoulders 11 and attempt to pry the bearing sleeve out of the bushing. Failure to thus move the bearing sleeve will indicate that the bolt is whole and he may then again turn the bearing sleeve and relock the parts.

Having fully described my invention what I claim as new and desire to secure by Letters-Patent, is:

1. In a staybolt structure, the combination with a bushing provided with an annular extension having internal segmental shoulders near its free end and also having slots in its wall, of a bearing sleeve for the head of a staybolt mounted freely in said bushing, said bearing sleeve having external segmental shoulders to coöperate with the segmental shoulders in the extension of the bushing and also having stop lugs or fingers entering the slots in the extension of the bushing.

2. In a staybolt structure, the combination with a bushing provided with an annular extension having open slots and internal segmental shoulders, of a bearing sleeve for the head of a staybolt mounted to turn in said bushing and having segmental shoulders to coöperate with the segmental shoulders of said extension, said sleeve also provided with stop lugs entering the slots in said extension, said bearing sleeve adapted for the application of a wrench, and a plug threaded in said sleeve and closing the latter over the head of the staybolt.

In testimony whereof, I have signed this specification in the presence of two subscribing witnesses.

ETHAN I. DODDS.

Witnesses:
S. G. NOTTINGHAM,
R. S. FERGUSON.

Copies of this patent may be obtained for five cents each, by addressing the "Commissioner of Patents, Washington, D. C."